April 8, 1958 G. W. FYLER 2,830,230

TELEVISION RECEIVER

Filed June 16, 1955

INVENTOR.
George W. Fyler
BY Mueller & Aichele
Attys.

2,830,230

TELEVISION RECEIVER

George W. Fyler, Lombard, Ill., assignor to Motorola, Inc., Chicago, Ill., a corporation of Illinois Application June 16, 1955, Serial No. 515,867

7 Claims. (Cl. 315—27)

Figures 1, 2:
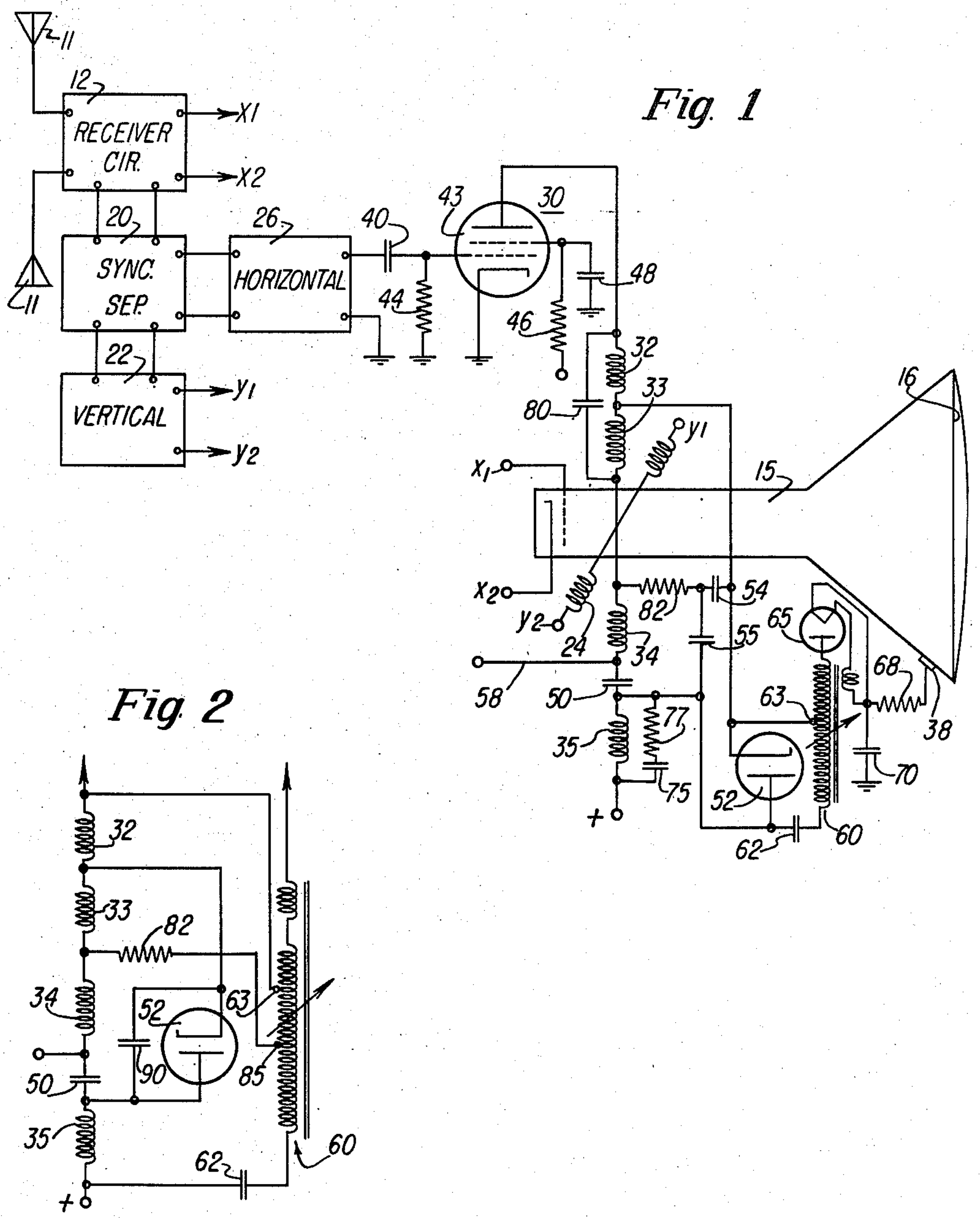

This invention relates to sweep systems for cathode ray tubes as used in television receivers, and more particularly to a sweep system which also provides an anode potential for the cathode ray tube.

The horizontal or line sweep system of many present day television receivers includes an electro magnetic deflection yoke which is positioned adjacent the path of the electron beam within the cathode ray tube and which is coupled to a source of sawtooth energizing signals so that it produces a field to deflect the beam across the screen of the tube. The sawtooth signals also include retrace portions to cause rapid return of the beam after full deflection thereof. Present sweep systems usually include an efficiency diode in a bootstrap circuit which adds a portion of the energy stored during the retrace portion to the trace portion to provide more efficient deflection of the beam. Such an efficiency diode or bootstrap circuit also tends to reduce ringing or oscillation, in the sweep system as energized by the sawtooth signals of rather sharply defined wave form.

Many of the prior art sweep systems include an output transformer to which the sawtooth signals are applied from the horizontal output tube. The transformer may be of the auto-transformer type with a secondary portion supplying current of the proper form to the deflection yoke. Generally the output transformer includes a high voltage secondary winding in auto transformer relation to the primary winding, and a rectifier circuit coupled to this high voltage winding provided an accelerating potential for the anode of the cathode ray tube. Therefore, such an output transformer would have at least a portion which carries the sawtooth sweep current. Thus the transformer must be constructed to carry such current and to hold the losses to permissible values. In addition the output transformer would also carry the direct current for operating the horizontal output tube which supplied the deflection signals and the transformer construction must be such that core saturation is minimized.

It is known to do away with the horizontal output transformer and to apply the signals directly to the deflection yoke with an efficiency diode or bootstrap circuit coupled to the yoke. Then the provision of high voltage for the anode of the cathode ray tube must be derived in some other way. I have provided the required high voltage from the yoke and such a system is shown in my copending application, Serial No. 420,235, filed April 1, 1954. The present application discloses and claims a different arrangement for providing high voltage which may be preferable in certain applications. For example, it may be desirable to employ a highly efficient deflection yoke which provides wide beam deflection and to do so would require a yoke having a physical size which takes up all the space available so that there is not room for components required to obtain the high voltage from the yoke itself.

The present invention has for an object the provision of an improved deflection and high voltage system for a television receiver.

Another object is to provide such an improved deflection system in which the yoke current is not applied to the high voltage transformer and the high voltage for the anode is not applied to the yoke.

Another object of the invention is to provide a deflection system for a cathode ray tube including a directly coupled yoke and a low cost highly efficient transformer for supplying only the accelerating potential to the cathode ray tube.

Still another object of the invention is to provide a beam deflection and high voltage accelerating system for a cathode ray tube including simple and improved apparatus for damping of the oscillations in such a system.

A feature of the invention is the provision of a sweep system for a cathode ray tube including an efficient deflection yoke directly connected to a source of energizing signals with an efficiency diode and a high voltage transformer coupled across portions of the yoke.

Another feature is the provision of a high voltage transformer in the deflection system of a television receiver to which energizing signals are supplied by a capacitor in order to keep direct current from the transformer and thus permit more efficient operation thereof while also reducing the construction costs of the transformer.

Still another feature of the invention is the provision of a deflection yoke directly coupled to the horizontal output tube with the yoke including a plurality of series connected sections, and a network comprising the primary of the high voltage transformer and an efficiency diode circuit parallel connected across at least a pair of the yoke sections, and a resistance connected between voltage center points of the yoke sections and the network to effect damping of the circuit for oscillation.

Further objects, features and the attending advantages thereof may be appreciated upon consideration of the following description when taken in conjunction with the accompanying drawings in which:

Fig. 1 is a schematic representation of a television receiver incorporating the invention; and Fig. 2 shows an alternate construction of the high voltage circuit.

In practicing the invention there is provided a sweep system for horizontal deflection of a cathode ray beam in an image reproducing tube as used in a television receiver. A suitable deflection yoke having a plurality of sections, and a bootstrap capacitor connected thereto, is adapted to be disposed on the neck of the image reproducing tube so that sawtooth signals applied thereto by the horizontal output tube in the receiver produces the desirable control effect on the beam. Coupled across at least a pair of the yoke sections is an efficiency diode for the bootstrap circuit. Connected through a capacitor across at least a pair of the sections of the deflection yoke is the primary of a high voltage transformer. The secondary of this transformer supplies a high voltage or accelerating potential for the anode of the cathode ray tube. Accordingly, there is no direct current from the horizontal output stage flowing in the high voltage transformer so that this transformer may be constructed to furnish the necessary high voltage at a lower cost, reduced size, and with greater efficiency. Furthermore, the deflection yoke construction is not limited by the high voltage system so that this yoke may be built to provide wide beam deflection with increased efficiency.

It is further contemplated by the invention to provide an oscillation damping circuit in the form of a resistance coupled between a voltage center point of the yoke sections and a voltage center point of the circuit comprising the bootstrap diode circuit and the primary winding of the high voltage transformer. Such a resistance provides improved damping in the sweep system and renders less critical the values of other components used in damping the system, such as a shunt capacitor across a portion of the deflection yoke.

Fig. 1 illustrates a television receiving system including an antenna 11 which receives a composite signal having a carrier modulated by video and synchronizing information and another carrier modulated by accompanying sound waves, and applies this signal to the receiver circuit 12. The receiver circuit may include suitable amplifiers and tuned circuits as well as demodulating stages to reproduce the sound waves of the received signal and to apply the video information of the signal to the cathode and control elements of cathode ray tube 15 by way of the leads marked X, and $X_2$. The received video signal may thus alter the intensity of an electron beam produced in the cathode ray tube 15 so that as such a beam strikes the screen 16 of this tube, its light output will vary according to the received video information. The synchronizing components of the received signal are also applied to the synchronizing separator circuit 20 which applies frame or vertical synchronizing signals to the vertical deflection circuit 22. The vertical deflection yoke 24 is disposed on the neck of the cathode ray tube 15 and this yoke is coupled to the vertical deflection circuit 22 by terminals $Y_1$ and $Y_2$ in order that the signals supplied thereby may provide frame or vertical scanning of the electron beams in the tube 15.

The synchronizing signal separator circuit 20 is also connected to the horizontal or line deflection circuit 26 which applies suitable pulses to the horizontal output circuit 30. As will be explained more fully below, the output circuit 30 applies a signal of suitable wave form to the horizontal deflection yoke comprising series connected yoke sections 32, 33, 34 and 35. The horizontal deflection yoke is disposed on the neck of the cathode ray tube 15 in such a manner that a control effect produced thereby will cause horizontal deflection or line scanning of the electron beam in the tube 15. As will also be explained in greater detail below, the horizontal sweep system further supplies a high voltage or accelerating potential to the cathode ray tube 15 at the connection terminal 38.

Considering now in detail the horizontal sweep system, it may be seen that the output of the horizontal deflection circuit 26 is applied through capacitor 40 and between the grid and cathode of the horizontal output tube 43. The grid leak path to cathode for tube 43 is provided by resistor 44. The cathode of tube 43 is shown at ground potential, and the screen grid thereof is shown coupled through screen dropping resistor 46 to a positive potential source. The screen grid is bypassed to ground by capacitor 48. The anode of horizontal output tube 43 is directly coupled through a D. C. path to the series connection of horizontal yoke sections 32–35. Yoke sections 34 and 35 are series connected through bootstrap capacitor 50 and the other side of winding section 35 is coupled to a positive potential source. Accordingly a current of sawtooth wave form supplied by the horizontal output stage 30 is applied to the yoke coils 32–35 which may then produce the desired horizontal deflection of the electron beam across the screen 16.

In order to charge bootstrap capacitor 50 and assist in the formation of the horizontal deflection signal, the diode 52 is provided which includes a cathode coupled to the junction of yoke sections 32—33 and an anode coupled to the junction of yoke section 35 and bootstrap capacitor 50. Diode 52 together with the series connected capacitors 54, 55 connected there across serve to damp the circuit after the occurrence of the retrace portion of the sawtooth wave form. The diode also serves to charge the bootstrap capacitor 50 by the energy stored in the yoke section immediately after retrace. Thus bootstrap capacitor 50 may maintain a charge which is added to the positive potential applied to yoke section 35 to provide an increased operating potential for the anode of tube 43. The lead 58 is connected to the junction of yoke section 34 and bootstrap capacitor 50 to supply this increased potential to other portions of the television receiving system which is a practice familiar to those in the art.

In order to obtain a high voltage or accelerating potential for the cathode ray tube, an auto transformer 60 has a portion of its winding coupled across the horizontal deflection yoke. As illustrated, one end of the transformer 60 is connected through blocking capacitor 62 to the junction of bootstrap capacitor 50 and yoke section 35 while a tap 63 of the transformer 60, representing a second input terminal thereto is connected to the junction of yoke sections 32, 33. Thus the input to the high voltage auto transformer 60 is across the damper diode 52. However, it is possible to connect the input to high voltage transformer 60 from the anode of tube 43 to the positive potential source, but the circuit as shown has the advantage of reducing the ringing or tendency for oscillation in the yoke portions 32–35. The high voltage of the auto transformer 60 is applied to the anode of high voltage rectifier 65 which has a filament circuit energized by means of a very small coil associated with the transformer 60. The filament of rectifier 65 is connected through resistor 68 to the high voltage terminal 38 of the cathode ray tube 15 and a filter capacitor 70 is connected from the filament to ground.

The auto transformer 60 may have a core structure providing an air gap which is variable, as is schematically illustrated, in order to provide size control in a familiar manner. Other methods of size control may also be used with the system.

It may be noted, therefore, that a portion of the horizontal deflection pulse applied by the horizontal output tube 43 is applied to the auto transformer 60 which increases the potential thereof and applies this potential to the rectifier 65. The rectified potential is filtered by capacitor 70 and applied to the terminal 38 for accelerating the electron beam.

It should be pointed out that the horizontal deflection yoke composed of sections 32–35 may be of rather small physical size thus increasing its efficiency and assisting in the production of a wider beam deflection angle without the introduction of difficulties obtaining when the accelerating potential is derived across the yoke. Furthermore, the high voltage or auto transformer 60 may be of comparatively simple and inexpensive construction since there is no direct current flowing through its primary due to blocking capacitor 62, and the alternating current flowing therein may be of small value in order to satisfy the minimal current requirement of the cathode ray tube 15. Accordingly much finer wire may be used in the primary of this transformer and there will be required fewer turns since the core will need no air gap as there is no direct current flowing in the primary of this transformer.

Transformer 60 may have an inductance of 10 to 20 times the inductance of the yoke sections 32–35 so that only five to ten percent of the horizontal output current will flow therein. Accordingly the entire horizontal sweep system is of simplified, improved and less expensive construction.

The invention also provides an improved damping circuit to prevent ringing current of various frequencies from being developed in the deflection yoke 32–35. To this end capacitor 75 and resistor 77 are series connected across yoke section 35 and these suppress ringing current of the order of 500 kilocycles which is likely to develop in the circuit consisting of yoke section 35 and inter-electrode capacity in the damper diode 52. Furthermore, capacitor 80 is connected across yoke sections 32, 33 in order to reduce the tendency for production of 250 kilocycle ringing current due to the distributed capacity of the various yoke sections. A resistor 82 is coupled from the junction of the two inter sections of the deflection yoke 33, 34, to the interconnection of capacitors 54 and 55. Resistor 82 greatly improves the damping in the yoke section so that the value of capacitor 80 is less critical. Damping resistor 82 further increases the effectiveness of capacitor 75 and resistor 77 in suppressing ringing current in coil section 35.

As shown in Fig. 2, it is also possible to connect resistor 82 to a center tap 85 of the primary winding of auto transformer 60 instead of to the junction of capacitors 54 and 55. The center tap 85, as well as the common connection between capacitors 54 and 55 of Fig. 1, may be termed voltage center points in a network comprised of the parallel connection of capacitors 54, 55, damping diode 52, and the primary of transformer 60. In the embodiment of Fig. 2 capacitors 54 and 55 are replaced by the single capacitor 90 shunting diode 52. It may also be seen that the primary of transformer 60 is coupled across all of the yoke sections 32–35, i. e. directly to the anode of tube 43 and to the positive potential source. This connection may also be used in the system of Fig. 1 and vice versa, but the system of Fig. 1 is the preferred embodiment in respect to ringing characteristics and derivation of the energy for transformer 60.

I claim:

1. In a television receiver, the combination of a cathode ray image reproducer having a source of electrons, a viewing screen, and an anode to accelerate the electrons and produce a beam impinging the screen, a deflection yoke winding adapted to produce a magnetic field in said image reproducer, a sweep system including an output stage direct current coupled to said yoke winding for supplying a periodic deflection signal to said deflection yoke winding so that said winding produces a field to deflect the beam across said screen, means supplying an energizing potential to said output stage through at least a portion of said deflection yoke winding, high voltage transformer means having a primary portion coupled to said deflection yoke winding to derive energy therefrom, said transformer means also having a step up portion, rectifier means coupled to said step up portion and to said anode so that a portion of the deflection signal is rectified and applied to energize said anode.

2. In a television receiver, the combination of a cathode ray image reproducer having a source of electrons, a viewing screen, and an anode to accelerate the electrons and produce a beam impinging the screen, a deflection yoke winding adapted to produce a magnetic field in said image reproducer, a sweep system including an output stage direct current coupled to said yoke winding for supplying a periodic deflection signal to said deflection yoke winding so that said winding produces a field to deflect the beam across said screen, capacitor means, a high voltage transformer having a primary portion coupled to said deflection yoke winding through said capacitor means and a step up portion, rectifier means coupled to said step up portion and to said anode so that a portion of the deflection signal is rectified and applied to energize said anode.

3. In a television receiver, the combination of a cathode ray image reproducer having a source of electrons, a viewing screen, and an anode to accelerate the electrons and produce a beam impinging the screen, yoke winding means adapted to produce a magnetic field in said image producer, a positive potential source, a sweep system including an output stage direct current coupled to said yoke winding means for supplying a periodic deflection signal thereto so that the same produces a field to deflect the beam across said screen, said winding means also including a connection to said positive potential source, blocking capacitor means, a high voltage transformer having a primary portion direct current coupled to said output stage and coupled to said positive potential source through said capacitor means, said high voltage transformer also having a step up portion, rectifier means coupled to said step up portion and to said anode so that a portion of the deflection signal is rectified and applied to energize said anode.

4. In a television receiver, the combination of a cathode ray image reproducer having a source of electrons, a viewing screen, and an anode to accelerate the electrons and produce a beam impinging the screen, a deflection yoke comprising a plurality of series coupled windings adapted to produce a magnetic field in said image producer, bootstrap capacitor means series connected intermediate a pair of said windings, a sweep system including an output stage direct current coupled to said deflection yoke for supplying a periodic deflection signal thereto so that the same produces a field to deflect the beam across said screen, rectifier means coupled across a winding of said yoke and said bootstrap capacitor means, blocking capacitor means, a high voltage transformer having a primary portion coupled across said bootstrap capacitor means and at least a pair of said windings through said blocking capacitor means, said transformer further having a step up portion, rectifier means coupled to said step up portion and to said anode so that a portion of the deflection signal is rectified and applied to energize said anode.

5. In a television receiver, the combination of a cathode ray image reproducer having an anode element and means for producing an electron beam, a deflection yoke having a center tap and comprising a plurality of series connected coil sections adapted to produce a magnetic field in said reproducer, bootstrap capacitor means interconnected in series relation with said coil sections intermediate the outer ends of the series connection thereof, blocking capacitor means, parallel coupled rectifier means and center tapped capacitor means connected across at least a pair of said coil sections and said bootstrap capacitor means, transformer means having primary and secondary winding portions, said primary winding portion being connected across at least a pair of said coil sections and said bootstrap capacitor means through said blocking capacitor means, potential supply circuit means connecting said secondary winding to said anode element of the reproducer, resistor means coupled between the respective center taps of said deflection yoke and said capacitor means for reducing oscillations in said coil sections, an output stage directly coupled to said deflection yoke for supplying a periodic deflection signal thereto, and means for applying a positive potential to said rectifier means, so that said bootstrap capacitor means supplies an operating potential to said output stage, and said transformer means supplies operating energy to said reproducer from said output stage.

6. In a television receiver, the combination of a cathode ray image reproducer having an anode element and means for producing an electron beam, a deflection yoke having a center tap and comprising a plurality of series connected coil sections adapted to produce a magnetic field in said reproducer, bootstrap capacitor means interconnected in series relation with said coil sections intermediate the outer ends of the series connection thereof, blocking capacitor means, rectifier means and capacitor means parallel coupled therewith and both connected across at least a pair of said coil sections and said bootstrap capacitor means, transformer means having primary and secondary winding portions, said primary winding portion having a center tap and being connected across at least a pair of said coil sections and said bootstrap capacitor means, through said blocking capacitor means, potential supply circuit means connecting said secondary winding to said anode element of the reproducer, resistor means coupled between the respective center taps of said deflection yoke and said primary winding portion for reducing oscillations in said coil sections, an output stage directly coupled to said deflection yoke for supplying a periodic deflection signal thereto, and means for applying a positive potential to said rectifier means, so that said bootstrap capacitor means supplies an operating potential to said output stage, and said transformer means supplies operating energy to said reproducer from said output stage.

7. In a television receiver, the combination of a cathode ray image reproducer having an anode element and means for producing an electron beam, a deflection yoke comprising a plurality of series connected coil sections adapted to produce a magnetic field in said reproducer, bootstrap capacitor means interconnected in series relation with said coil sections intermediate the outer ends of the series connection thereof, a blocking capacitor, damping and potential supply means including rectifier means, capacitor means and transformer means having primary and secondary winding portions, said rectifier means, and said capacitor means both being connected in parallel across at least a pair of said coil sections and said bootstrap capacitor means, said primary winding portion being coupled across a pair of said coil sections and said bootstrap capacitor means through said blocking capacitor, said rectifier means including means for connection to a positive potential source, circuit means connecting said secondary winding to supply high voltage for said anode element of the reproducer, resistor means coupled between voltage center points of said coil sections and said damping and power supply means for reducing oscillations in said coil sections, and an output stage directly coupled to said deflection yoke for supplying a periodic deflection signal thereto, so that said damping means and said bootstrap capacitor means supply operating potential to said output stage, and said transformer means supplies an operating potential to said reproducer.

References Cited in the file of this patent

UNITED STATES PATENTS

| | | |
|---|---|---|
| 2,397,150 | Lyman | Mar. 26, 1946 |
| 2,523,108 | Friend | Sept. 19, 1950 |
| 2,627,052 | Helpert et al. | Jan. 27, 1953 |
| 2,645,717 | Massman | July 14, 1953 |
| 2,686,276 | Anderson | Aug. 10, 1954 |
| 2,712,616 | Leeds | July 5, 1955 |
| 2,729,764 | Dietch | Jan. 3, 1956 |